United States Patent [19]

Okuda

[11] 4,162,618
[45] Jul. 31, 1979

[54] DEVICE FOR ROLLS IN HIGH SPEED ROLLING MILLS AND THE LIKE

[75] Inventor: Hiroji Okuda, Kitakatsuragigun, Japan

[73] Assignee: Koyo Seiko Company Limited, Osaka, Japan

[21] Appl. No.: 819,216

[22] Filed: Jul. 25, 1977

[51] Int. Cl.² .................. F16D 3/06; F16C 35/08
[52] U.S. Cl. ............................. 64/23; 64/8; 64/1 C
[58] Field of Search ................ 64/1 C, 8, 23, 9 R

[56] References Cited

U.S. PATENT DOCUMENTS

| | | | |
|---|---|---|---|
| 2,914,929 | 12/1959 | Irons | 64/23 |
| 2,959,943 | 11/1960 | Allen | 64/9 |
| 2,986,021 | 5/1961 | Mottu | 64/9 |
| 3,126,722 | 3/1964 | Krämer | 64/8 |
| 3,367,142 | 2/1968 | Groves | 64/23 |
| 3,633,383 | 1/1972 | Kleinschmidt | 64/23 |
| 3,754,411 | 8/1973 | Orain | 64/23 |
| 3,779,037 | 12/1973 | Petros | 64/23 |
| 3,940,948 | 3/1976 | Schultenkämper | 64/23 |
| 3,942,336 | 3/1976 | Schultenkämper | 64/23 |

FOREIGN PATENT DOCUMENTS 1201438  8/1970  United Kingdom ................ 64/23

Primary Examiner—Charles J. Myhre
Assistant Examiner—R. C. Turner
Attorney, Agent, or Firm—Mason, Fenwick & Lawrence

[57] ABSTRACT

A driving device for rolls in high speed rolling mills and the like, designed to effect the centering of a drive shaft element and of a driven shaft element and the transmission of torque. In a hollow space defined in a shaft assembly comprising two shaft members coupled together as by a spline connection for rotation as a unit, a spring is disposed which acts to axially extend the drive shaft. Either the inner bottom surface of a driven fitting yoke coupled to one end of the shaft assembly through a joint member and loosely fitted on the driven shaft element or the end surface of the driven shaft element is provided with a conical projection axially aligned with the fitting yoke and the driven shaft element while the other is provided with a conical opening adapted to tightly engage the conical projection, thereby achieving automatic axial alignment between the driven fitting yoke and the driven shaft element and eliminating the problem of the rotational vibration of the drive shaft.

1 Claim, 5 Drawing Figures

DEVICE FOR ROLLS IN HIGH SPEED ROLLING MILLS AND THE LIKE

BACKGROUND OF THE INVENTION

The present invention relates to a driving device for rolls in high speed rolling mills and the like.

A drive shaft for driving the rolls of a rolling mill, for example, couples together a drive shaft element and a driven shaft element, which is the roll neck portion of the rolling mill, and through universal joints included at two places in the drive shaft itself it also effects the centering of the drive and driven shaft elements and the transmission of torque. The drive shaft includes fitting yokes which form the opposite ends thereof and which are adapted to be fitted on the drive and driven shaft elements, whereby the drive shaft is connected to these shaft elements.

The serious drawback inherent in such conventional drive shaft lies in the fact that in order to facilitate the exchange (mounting and dismounting) of rolling mill rolls, the roll neck portion of the rolling mill, which is the driven shaft element, and the driven fitting yoke are fitted and coupled together with a clearance or play therebetween, said clearance resulting in a rotational vibration being exerted in the drive shaft, said rotational vibration being transmitted to the rolling mill roll and greatly decreasing the accuracy of rolling while repeatedly imparting a vibratory impact to the bearings supporting the rolling mill roll and backup roll and hence damaging these bearings in a short period of time.

On the other hand, recent rolling mills are confronted by the important problems of speeding up the rolling operation and improving the rolling accuracy and the rate of operation. With the conventional drive shaft, however, the adverse influence of said vibration becomes more conspicuous with the speedup of the rolling mill and there are difficulties in providing a sufficient mechanical strength. If the roll neck and the fitting yoke are fitted together with an interference fit in order to eliminate said vibration, the exchange of rolls would become impossible. Thus, it has been impossible to solve said problems.

SUMMARY OF THE INVENTION

An object of the present invention is to achieve the speedup of a rolling mill and the improvement of rolling accuracy while preventing the rotational vibration due to said connection of the drive shaft.

Another object of the invention is to facilitate the exchange of rolling mill rolls and axial alignment between the driven fitting yoke and the rolling mill roll, i.e., the driven shaft element, which are fitted together.

A further object of the invention is to provide a drive shaft having a sufficient mechanical strength, easy to produce and adapted to transmit high speed rotation to a rolling mill roll.

According to the invention, in a hollow chamber having a sufficient diameter and an axial length and defined between two cylindrical shaft members which are fitted together so as to constitute an axially expansible shaft assembly in a drive shaft, there is disposed a spring which acts to space said two shaft members apart from each other. This facilitate the design of a spring having the proper strength and providing the proper deflection and also makes it possible to compact the entire drive shaft. Further, it becomes possible to space the spline coupling portion between the two shaft members sufficiently radially apart from the axis of the drive shaft to reduce the resistance to the sliding movement between the two shaft members along the spline coupling portion, thus facilitating the extension and collapsing of the drive shaft and reducing wear on the spline coupling portion.

Further, the fitting yoke on the driven side of the drive shaft has a fit such that it is fitted on the end of the driven shaft element, which is the neck portion of the rolling mill roll, and is made integral with said driven shaft element for rotation as a unit in the direction of rotation thereof. Since it is loosely fitted on and coupled to the end of the driven shaft with a slight clearance therebetween, the mounting and dismounting of rolling mill rolls are facilitated and hence the time and labor required for the exchange of rolling mill rolls can be greately reduced.

Further, the driven shaft element and the driven fitting yoke, in their fitted and coupled state, have their axes aligned with each other. More specifically, their axes can be automatically aligned with each other since a conical projection formed either on said driven shaft or on said driven fitting yoke and a conical opening formed in the other are tightly fitted together by the force of the spring acting to extend said shaft assembly. As a result, the production of vibration can be prevented despite the high speed rotation of the drive shaft during the operation of the rolling mill. Thus, since no vibration is exerted in the rolling mill roll, the rolling accuracy is greately improved and the life of the bearing is greately prolonged.

DESCRIPTION OF THE PREFERRED EMBODIMENTS

Figure 1:
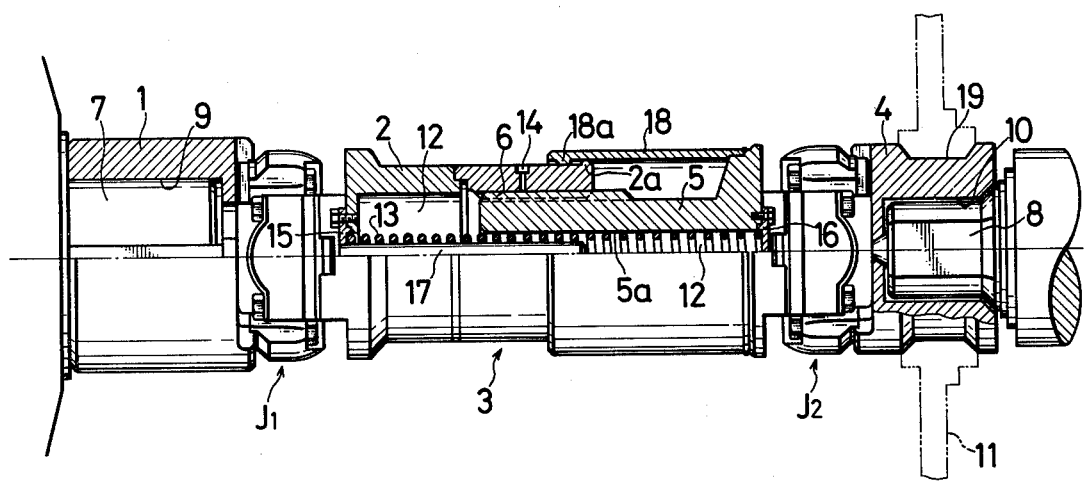
FIG. 1 is a view, partly in longitudinal section, of an embodiment of the present invention.
Figure 2:
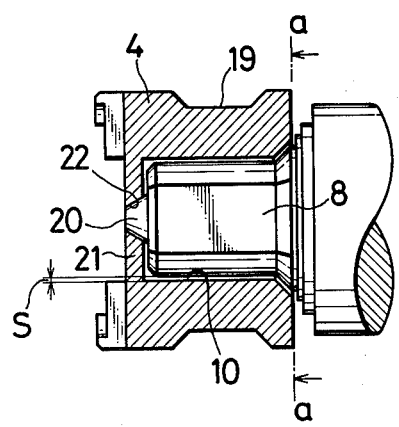
FIG. 2 is a sectional view showing a fit between a driven fitting yoke and a driven shaft element.
Figure 3:
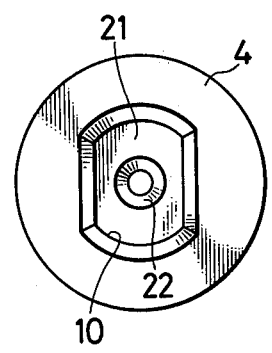
FIG. 3 is an end view taken along the line a—a of FIG. 2.

Referring to FIGS. 1 through 3 showing an embodiment of the invention, 1 designates a driven fitting yoke and 2 designates a shaft member coupled to said yoke 1 by a joint member $J_1$. These members constitute a universal joint and provide one half, serving as a drive assembly, of the drive shaft. The numeral 4 designates a driven fitting yoke and 5 designates a shaft member coupled to said yoke 4 by a joint member $J_2$. These members constitute a universal coupling and provide the other half, serving as a driven assembly, of the drive shaft. The two shaft members 2 and 5 are each in the form of a sleeve and are splined to each other as at 6 for the transmission of torque and for an axial sliding movement, whereby the halves provide an extensible shaft assembly 3.

The drive fitting yoke 1 is in the form of a bottomed cylinder whose inner periphery has a fitting portion 9 whereby the yoke is fitted on the end of a drive shaft element 7 extending from a drive source (not shown) and made integral therewith for rotation as a unit in the direction of rotation of the drive shaft. The yoke 1 is fixedly fitted on and coupled to the drive shaft element 7 as by known shrinkage fit. On the other hand, the driven fitting yoke 4 is in the form of a bottomed cylinder whose inner periphery has a fitting portion 10 whereby the yoke is fitted on the end of a driven shaft element 8, which is the neck portion of the rolling mill roll, and is made integral therewith for rotation as a unit in the direction of rotation of the drive shaft. It is loosely fitted on and coupled to the end of the driven shaft element 8 with a slight radial clearance S defined therebetween. With the drive shaft constructed in the manner described above, the extension and collapsing of the shaft assembly 3 permitting the sliding movement of the shaft members 2 and 5 permit the mounting and dismounting of the driven fitting yoke 4 on and from the driven shaft element 8 located at a given invariable distance from the drive shaft element 7.

The numeral 11 designates the dogs of a support device (not shown) adapted to clamp and pull the driven fitting yoke 4 toward the drive side to disconnect the drive shaft from the driven shaft element 8, and 19 designates a peripheral groove in which said pair of dogs will be fitted to clamp and pull the driven fitting yoke 4 when it is desired to effect said disconnection.

In the construction described above, defined between the two shaft members 2 and 5 slidably fitted and coupled together is a hollow chamber 12 longitudinally extending through the axial central portions thereof, and accomodated in said hollow chamber 12 is a spring 13 which acts in a direction which spaces said two shaft members 2 and 5 apart from each other, i.e., in a direction which expands the shaft assembly 3, said spring being designed to provide a deflection required to permit the sliding movement necessary for mounting and dismounting of the fitting yokes 1 and 4 on and from their respective associated drive and driven shaft elements 7 and 8. Further, said spring is set between the shaft members 2 and 5 so that in an attached state in which the driven fitting yoke 4 and the driven shaft element 8 are fitted and coupled together, the spring provides a suitable spring action for longitudinally extending the shaft assembly 3. Therefore, even when the fitting yoke 4 is subjected to an action which tends to slip off the yoke from the driven shaft element 7 on which the yoke is fitted, the displacement of the fitting yoke 4 from its proper fitting position is prevented by the counteraction of the spring 13.

Thus, the fitted and coupled state established between the drive shaft element 7 or driven shaft element 8 and the drive fitting yoke 1 or driven fitting yoke 4 is prevented from becoming imperfect during the rotation of the drive shaft.

On the other hand, the driven shaft element 8 and the driven fitting yoke 4, which are loosely fitted and coupled together with a slight radial clearance S defined therebetween, are given the function of automatically bringing their axes into alignment with each other in their fitted state. More specifically, as shown in FIG. 2, the end surface of the driven shaft element 8 is formed at its center with a conical projection 20 aligned with the axis of said shaft element 8, while the bottom 21 of the driven fitting yoke 4 is formed at its center with a conical opening 22, which has the same taper angle as that of said conical projection 20, in such a manner that the axis of the conical opening is aligned with the rotational axis of the driven fitting yoke 4, said conical projection 20 on said driven shaft element being fitted in said conical opening 22. The fitting between said conical projection 20 and said conical opening 22 is tightly effected as a result of the driven fitting yoke 4 being urged against the end of the driven shaft element 8 by the resilient force of the spring 13, and the rotational axes of the driven shaft element 8 and driven fitting yoke 4 are automatically aligned with each other.

Figure 4:
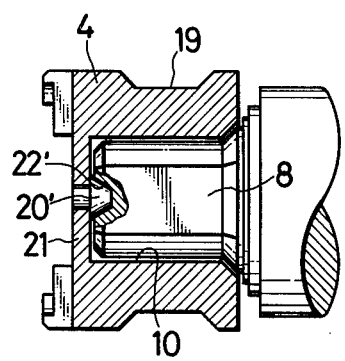
FIG. 4 is a longitudinal section of another embodiment of the invention.

The locations of said conical projection 20 and conical opening 22 shown in FIG. 2 may be reversed. Thus, as shown in FIG. 4, a conical projection 20' may be formed on the inner bottom of the driven fitting yoke 4 and a conical opening 22' may be formed in the end surface of the driven shaft element 8. In this case also, they are tightly fitted together and automatically aligned with each other. In this arrangement, the center hole of the roll, if machined to the proper size, can be used as said conical opening 22'.

Designated at 18 is a cover fixed at its base on the outer periphery of the base of one shaft member 5 and slidably fitted at its front end on the other shaft member 2. The cover 18 is provided on the inner periphery of its front end with a projection 18a engageable with a projection 2a on the outer periphery of the inner end of the shaft member 2. The engagement between the projections 18a and 2a holds the shaft members 2 and 5 together against inadvertent disconnection when the drive shaft is removed in its entirety, or when it is detached from the drive shaft element 7 and/or the driven shaft element 8, or when the drive shaft is being transported. The cover 18 serves to prevent the entry of dust into the spline coupling portion 6. Thus, it forms a seal for the shaft member 2, further improving the effect of preventing leakage of the lubricant contained therein.

Spring seats 15 and 16 are attached to the shaft members 2 and 5 respectively at the opposite ends of the hollow chamber 12 defined by the shaft members. The spring 13 is provided between the spring seats 15 and 16. The spring 13 is supported, on the driven side, at its outer peripheral portion by the inner wall 5a of the shaft member 5 defining the hollow chamber 12 and, on the drive side, at its inner peripheral portion by a shaft 17 extending from the spring seat 15 fixed to the shaft member 2, said shaft 17 extending into the hollow space defined by the inner wall 5a. The inner wall 5a and the shaft 17 prevent the spring 13 from buckling. Further, since the hollow chamber 12 accommodating the spring 13 is defined by the inner cylindrical surfaces of the shaft members 2 and 5 and is in communication with the spline coupling portion 6, the lubricant applied to the spline coupling portion 6 through an oil port 14 ingresses into the chamber 12, lubricating the spring 13 to prevent the corrosion of the shaft member 5 and the like. This results in prolonging the life of the spring 13, providing the proper spring action and retaining the parts in position with stability over a prolonged period of time.

Figure 5:
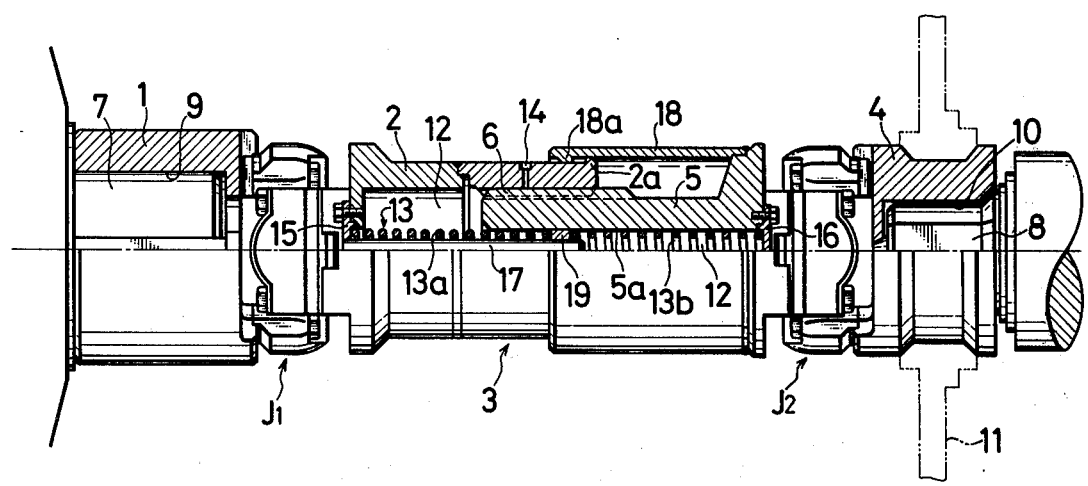
FIG. 5 is a view, partly in longitudinal section, of a further embodiment of the invention.

FIG. 5 shows another embodiment of this invention in which the spring 13 in the foregoing embodiment is divided into two segments 13a and 13b with a spacer provided therebetween. This makes it possible to prevent the buckling of the spring 13 more effectively and renders the spring 13 easy to produce.

What is claimed is:

1. A driving device for rolls in high speed rolling mills and the like, wherein a drive shaft element and a driven shaft element are interconnected by a drive shaft which is longitudinally extensible and which effects the centering of the drive shaft element and of the driven shaft element and the transmission of torque by means of joint members included at two places in the drive shaft, said driving device comprising:

- a shaft assembly which renders said drive shaft longitudinally extensible, said shaft assembly comprising two shaft members in the form of sleeves fitted together as by a spline connection so as to be only axially slidable, said shaft assembly having a drive fitting yoke coupled to one end thereof by one of said joint members for the transmission of the rotational force of the drive shaft element,
- at least one spring provided between spring seats at ends of the two shaft elements and supported on the driven side at its outer peripheral portion by an inner hole of the driven shaft element and on the drive shaft side at its inner peripheral portion by a support shaft fixed in the end of the drive shaft element, said spring urging the shaft assembly in a direction which extends the shaft assembly,
- a driven fitting yoke in the form of a bottomed cylindrical body coupled to the other end of the shaft assembly by the other joint member and loosely fitted on the driven shaft element in such a manner that the transmission of torque to the driven shaft element is possible, said driven fitting yoke and said driven shaft element having a fit between an oval-shaped modified shaft and a hole of a corresponding shape, the inner bottom of said driven fitting yoke and the end surface of said driven shaft element being provided at their respective centers with fitting means for bringing the axes of the driven fitting yoke and the driven shaft element into alignment with each other, said fitting means being a conical opening and a conical projection adapted to be tightly fitted in the conical opening, said conical opening being provided either at the center of the inner bottom surface of the driven fitting yoke or at the center of the end surface of the driven shaft element, said conical projection being provided at the other center.

* * * * *